United States Patent [19]
Daly et al.

[11] Patent Number: 5,875,394
[45] Date of Patent: Feb. 23, 1999

[54] METHOD OF MUTUAL AUTHENTICATION FOR SECURE WIRELESS SERVICE PROVISION

[75] Inventors: Brian Kevin Daly, Redmond; Leslie Dale Owens, Issaquah, both of Wash.

[73] Assignee: AT & T Wireless Services Inc., Kirkland, Wash.

[21] Appl. No.: 777,341

[22] Filed: Dec. 27, 1996

[51] Int. Cl.[6] .............................. H04M 1/66; H04M 3/00
[52] U.S. Cl. ................. 455/411; 455/419; 340/825.34; 380/23
[58] Field of Search ..................... 455/411, 410, 455/419, 418, 551, 435, 432, 552; 340/825.34, 825.54; 380/23, 21, 25, 14, 49

[56] References Cited

U.S. PATENT DOCUMENTS

| | | | |
|---|---|---|---|
| 4,901,340 | 2/1990 | Parker et al. | 455/411 |
| 5,077,790 | 12/1991 | D'Amico et al. | 380/23 |
| 5,091,942 | 2/1992 | Dent | 380/46 |
| 5,237,612 | 8/1993 | Raith | 380/23 |
| 5,241,598 | 8/1993 | Raith | 380/21 |
| 5,299,263 | 3/1994 | Beller et al. | 380/30 |
| 5,303,285 | 4/1994 | Kerihuel et al. | 379/58 |
| 5,319,711 | 6/1994 | Servi | 380/49 |
| 5,488,649 | 1/1996 | Schellinger | 455/426 |
| 5,513,245 | 4/1996 | Mizikovsky et al. | 379/59 |
| 5,559,886 | 9/1996 | Dent et al. | 380/23 |
| 5,603,084 | 2/1997 | Henry, Jr. et al. | 455/419 |
| 5,625,869 | 4/1997 | Nagamatsu et al. | 455/411 |
| 5,689,563 | 11/1997 | Brown et al. | 455/411 |
| 5,748,742 | 5/1998 | Tisdale | 380/49 |

*Primary Examiner*—Dwayne D. Bost
*Assistant Examiner*—Tracy M. Legree

[57] ABSTRACT

A mutual authentication process assures that a subscriber does not provide sensitive activation information to an imposter network and a network does not provide sensitive activation information to an imposter subscriber. The mutual authentication is facilitated by a pair of passwords that are communicated between the activation center of the network and the subscriber via a secure channel.

16 Claims, 2 Drawing Sheets

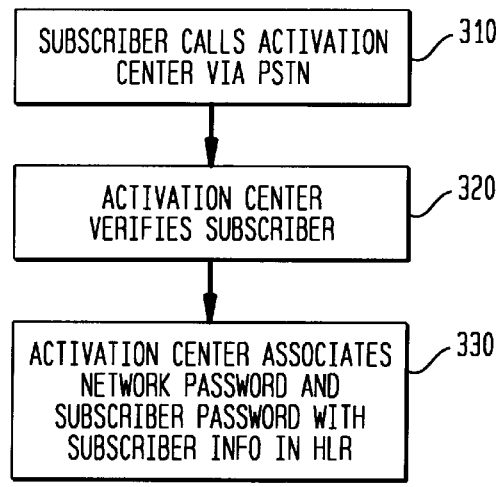
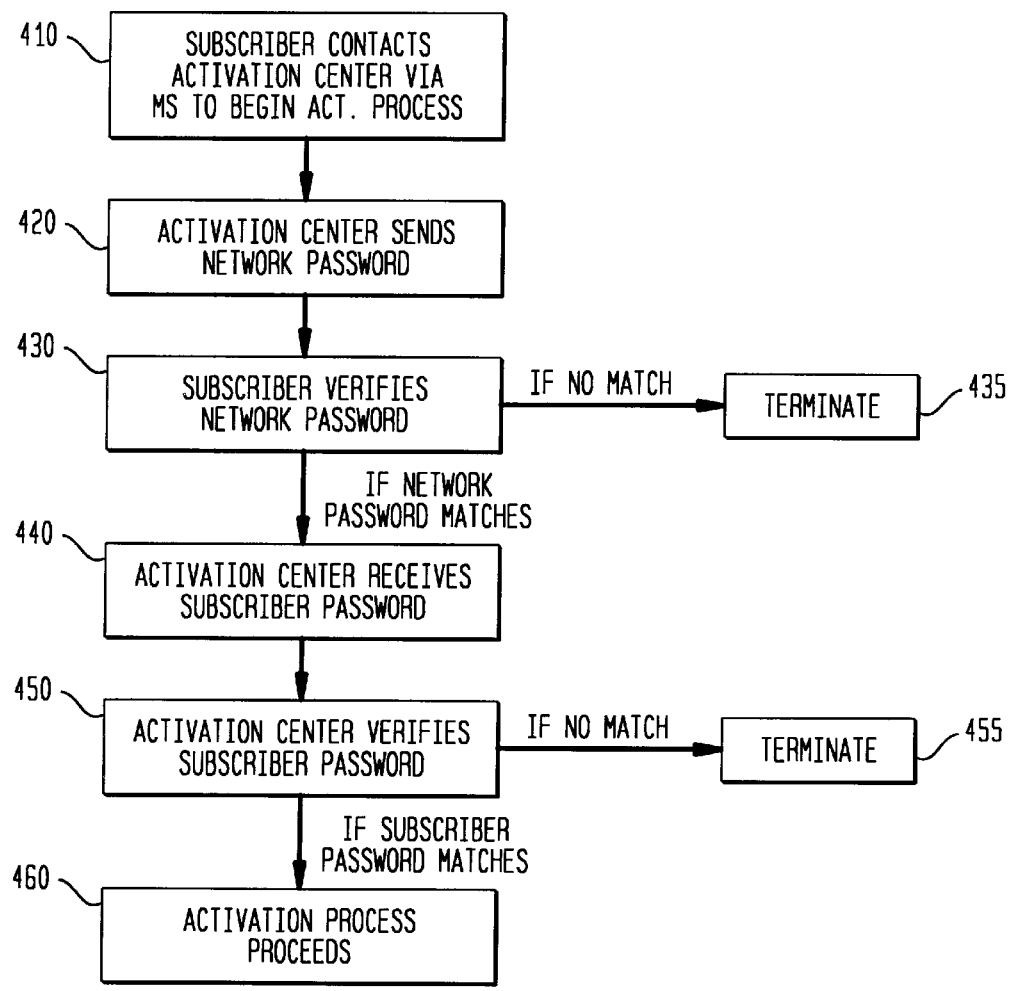

METHOD OF MUTUAL AUTHENTICATION FOR SECURE WIRELESS SERVICE PROVISION

The present invention is directed to a method of mutual authentication before providing services. More particularly, the present invention is directed to a method in which a subscriber is provided with password information via a secure channel prior to a service provisioning operation.

It is known in the wireless communications area to provide over-the-air activation capabilities for a mobile station. In particular, it is known for a subscriber who has obtained possession of a mobile station, either by purchase or lease, to initiate an activation process via wireless communication to an activation center. An example of a system in which over-the-air activation is performed is illustrated in FIG. 1. Mobile station 120 can communicate via wireless communications with base station 130 in the wireless network. The base station is coupled to a mobile switching center 140. The switching center controls the flow of communications to and from the base station 130. A message center 150 is coupled to the mobile switching center 140 and incorporates an over-the-air processor module 155. A Home Location Register (HLR) 160 is coupled to both the MSC 140 and the message center 150. An activation center 170 is coupled to the over-the-air processor module 155. Over-the-air programming of a mobile station is generally described in co-pending application Ser. No. 08/728,275 entitled *A Method and Apparatus for Over-the-Air Programming of Telecommunication Services* filed on Oct. 8, 1996. The disclosure of this related application is incorporated by reference herein.

The mobile stations typically have two identification numbers associated therewith. First, a Mobile Identification Number (MIN) which corresponds to the telephone number to be encoded into the station in the Activation Process. In addition, an Electronic Serial Number (ESN) is encoded into the station. The ESN is assigned by the manufacturer of the station. Thus, when programmed the ESN and MIN operate to specifically identify a mobile station.

In its known configuration, over-the-air activation may be prone to instances of fraud. For instance, the subscriber can be defrauded by believing he is communicating via the mobile station to a legitimate network provider and as a result, might provide critical personal information such as a social security number or credit card information to a pirating party. Alternatively, the network provider can be defrauded by a mobile station which has cloned the ESN information from an actual subscriber so that the provider gives service to the fraudulent party.

FIG. 1 illustrates that the mobile station may communicate not only with a legitimate base station 130, but its communications may be intercepted by a pirate base station 110. In such circumstances, the pirate base station may seek to emulate the network with which the subscriber wishes to communicate. By pirating the communication originating from mobile station 120, the pirate base station obtains identification information with regard to the mobile station, namely the ESN and a cryptographic authentication key. Also, to the extent that the pirate emulates an activation center, the subscriber of the mobile station 120 may be coaxed to provide personal data, such as credit card data, which the pirate can then subsequently use to their own advantage. The pirate can alternatively use the ESN, to replicate an actual subscriber station and defraud the service provider.

Thus, there is a need for providing mutual authentication between a subscriber and the activation center, namely the subscriber must be able to confirm that it is communicating with the actual activation center and the activation center must be able to confirm that it is communicating with a legitimate subscriber.

SUMMARY OF THE INVENTION

The present invention provides a method for mutually authenticating the subscriber and activation center so as to avoid pirating of critical information during an over-the-air activation process and to avoid the theft of service. In accordance with the method of the present invention, the subscriber and the activation center communicate via a secure channel so as to determine a network password and a subscriber password which are to be used during an activation process. Subsequently, when the subscriber initiates the over-the-air activation process the activation center is to forward the network password. If the subscriber does not receive a network password or the network password received does not match that previously agreed to with the activation center, then the activation process is terminated. Subsequently, the activation center requests transmission of the subscriber password. The activation center then verifies that the appropriate subscriber password has been received for the ESN associated with the contacting mobile station. If the received subscriber password does not match the password previously assigned, then the activation process is terminated.

The order of the exchange of passwords could be reversed, namely the subscriber could send the subscriber password first. However, this would means that the subscriber might still be vulnerable to a pirating party.

In one embodiment of the present invention, the subscriber and activation center communicate via the Public Switch Telephone Network (PSTN) which is generally secure from pirates. The over-the-air activation center can either assign a subscriber password/network password pair or, alternatively the activation center may allow the subscriber to select a network or subscriber password so as to enhance the subscriber's ability to recall the activation passwords.

In another embodiment, the network password and subscriber password are assigned to the mobile station prior to transferring possession of the mobile station to the subscriber. In one advantageous embodiment the packaging for the mobile station includes information setting forth the network password and the subscriber password. The subscriber will then use this information which has been securely provided to the user, to access the full activation process for the mobile station.

Since the subscriber password and network password need only be used during the activation process, once the mobile station has been activated, then the subscriber password and network password pair become superfluous. Thus, the activation center can assign either the same network password or the same subscriber password to another subscriber.

By providing this secure communication of a network password/subscriber password pair, the present invention provides the ability to mutually authenticate the mobile station and the network at the beginning of an activation process.

SUMMARY OF THE DRAWINGS

FIG. 3 describes the flow of a process for providing mutual authentication information to a subscriber.

FIG. 4 illustrates a flow of a process for mutually authenticating subscriber network in accordance with the present invention.

DETAILED DESCRIPTION

So as to reduce the risk of piracy in an over-the-air activation process, the present invention provides that the subscriber must authenticate itself to the activation center, and the activation center must authenticate itself to the subscriber before proceeding with the activation process where sensitive information may be exchanged.

Figure 1:
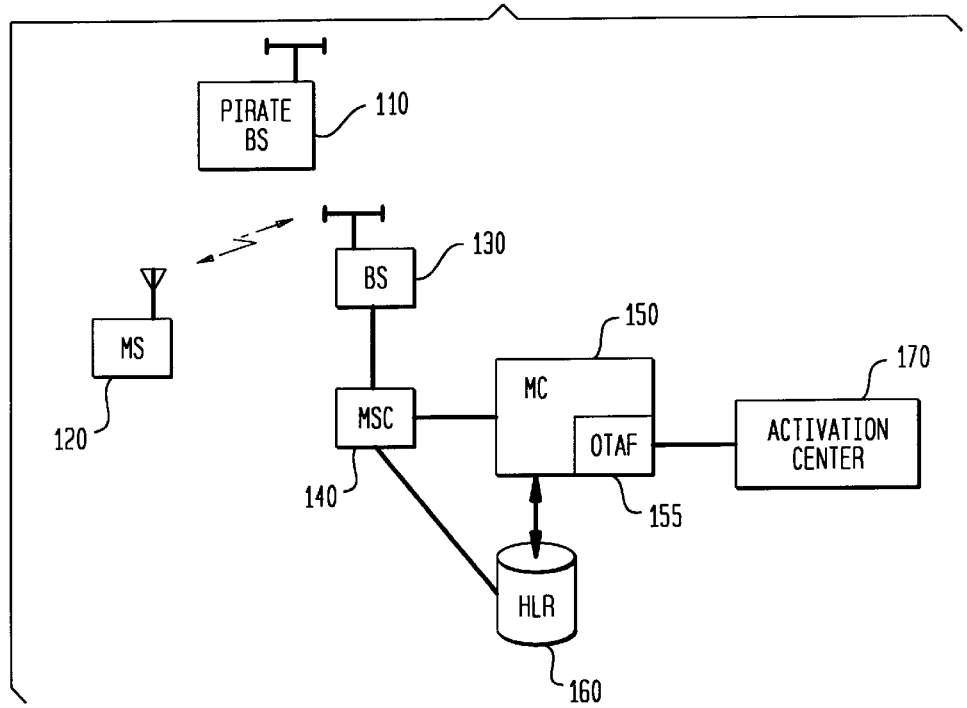
FIG. 1 illustrates a wireless system in block diagram form in which over-the-air activation is performed.
Figure 2:
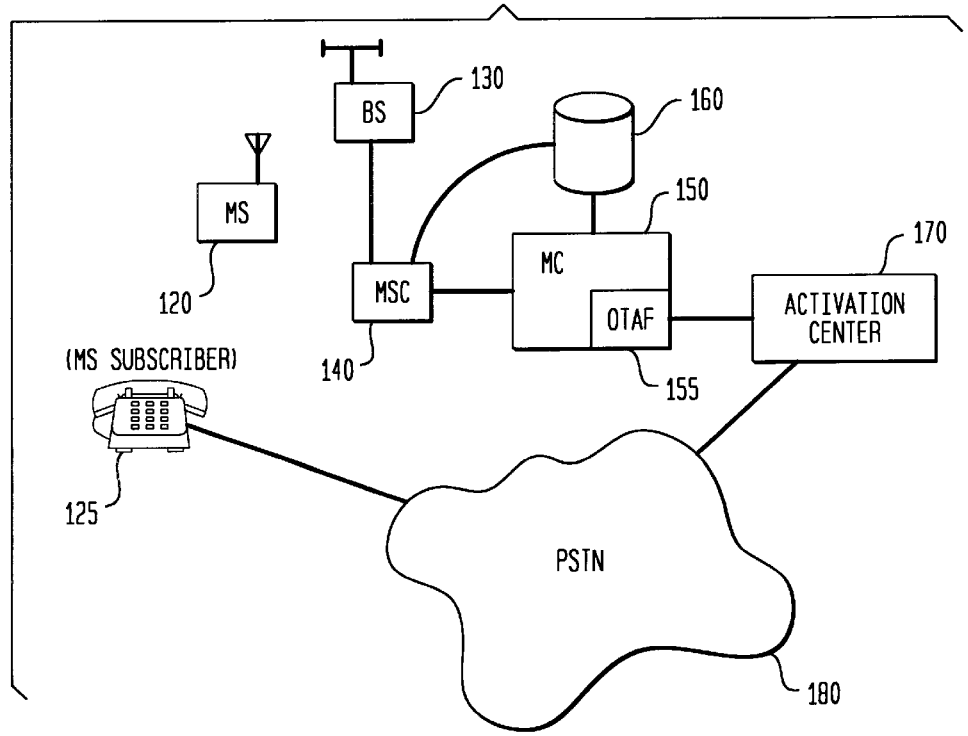
FIG. 2 illustrates an embodiment of the present invention in which mutual authentication information is passed between a subscriber and an activation center.

In accordance with one embodiment of the present invention, the subscriber, prior to the activation process, obtains information regarding a network password and a subscriber password. This authentication information is shared between the activation center and the subscriber prior to the activation process. In particular, in one embodiment illustrated in FIG. 2, where all of the elements which are the same as those in FIG. 1 bear the same reference numerals, the mobile station subscriber establishes a secure channel of communication to activation center 170 via, for example, a telephone 125 and the Public Switched Telephone Network (PSTN) 180.

As illustrated in FIG. 3, the subscriber and the activation center coordinate on the passwords to be used for mutual authentication. In accordance with step 310, a subscriber can call an activation center via the PSTN. For instance, the subscriber may place a call to a land-line 1-800 number established by the carrier associated with the activation center. Such a land-line number could be provided to the subscriber via advertisements or in the materials or packaging provided with the mobile station. In step 320, the activation center verifies the subscriber. This can be done in a number of different ways. In one embodiment, the network or activation center first requests the name of the subscriber. This request can be provided by live operator or may be done using an IVR (Interactive Voice Response) unit. In fact, this entire procedure may be automated to reduce costs. The activation center can then use the name provided and ANI (Automatic Number Information) provided by the land-line connection to verify that the subscriber is legitimate. The network assures that the person is calling from a telephone number associated with a legitimate address that belongs to or is inhabited by the user. This may require a communication to a "white-pages directory" database service. However, the present invention is not limited to verification utilizing ANI processes. After the subscriber has been verified, then the activation center associates a network password and a subscriber password with the subscriber information in the Home Location Register (HLR) as in step 330. In one variation, the network generates two random, one-time passwords or pass phrases. The passwords are not repeated and are non-deterministic so that third parties cannot replay the information. However, they should not be too complex. Since they are used only once, they have no value to a third party following activation of the legitimate subscriber. However, if a subscriber obtains passwords it would be advantageous to circumscribe the amount of time during which they can be used. For example, the subscriber could be given 48 hours to activate the phone from the time that the passwords are assigned. If the mobile station is not activated in that time then the passwords would expire and the subscriber would not be able to complete an activation process using those passwords. Alternatively, once the subscriber has been verified it would be possible for the subscriber to select the two passwords or there could be some combination of selection of the passwords via interaction of the activation center and the subscriber so as to enhance the subscriber's ability to remember and utilize the passwords. The subscriber would then be instructed to use these passwords in the activation process.

FIG. 4 illustrates one embodiment for a process flow for the activation process subsequent to the assignment of the passwords. In step 410, the subscriber contacts the activation center via the mobile station to begin the activation process. During the activation process the activation center sends a network password to the subscriber, step 420. To do so, the network looks up the pre-stored password for the subscriber after the subscriber has been identified by the activation center either by the mobile station ESN, or by the subscriber's name for example. The network then provides the pre-stored network password to the subscriber. The subscriber then verifies the network password, step 430. The subscriber specifically checks to see if the network password provided is in fact, the one provided via the secure channel pre-activation process described with relationship to FIG. 3 above. If the network password does not match, then the subscriber terminates the call, step 435. Under those circumstances it is presumed that the subscriber has encountered a fraudulent network. The subscriber could then contact the carrier's customer service center to report this event. If, however, the network password is verified and the mobile station provides notice of that fact to the activation center, then the activation center can ultimately receive the subscriber password. This could be provided by the subscriber in response to a prompt from the network. It could take the form of a voice prompt and the subscriber could enter the password via the keypad or could speak it. The activation center then verifies the subscriber password against the password previously stored in the database. If the received subscriber password does not match that stored then the network can terminate the process. If the subscriber password matches then the activation process proceeds whereby the service provisioning process continues with the assignment of the MIN, the receipt of credit information, etc.

By employing this password pair in a secure communication between the activation center and the subscriber, it is possible to provide the mutual authentication of the subscriber in the network which is desirable to defeat piracy in the wireless context. The subscriber does not divulge sensitive information to a network imposter. The network does not activate an imposter.

In the embodiment described above, the password information, that is mutual authentication information, is provided to the subscriber via a land-line communication. However, alternative methods for providing this password pair to the subscriber are possible. For instance, it would be possible to provide the password pair to the subscriber via the packaging associated with the mobile station. Presumably, potential imposters would not have access to the packaging materials for the mobile station prior to the activation of the station. In another embodiment, this could be done via alternative data communication paths between the subscriber and the activation center, e.g., facsimile transmissions, on-line data transmissions, etc. These will provide the subscriber and the activation center with a secure channel for transmitting the mutual authentication information. Once the mutual authentication information is agreed upon and that information is properly stored at the activation center, then the mobile station and the activation center can proceed with an activation process with the assurance that the subscriber will not mistakenly provide sensitive activation information to an imposter network and the network will not provide sensitive information, e.g., MIN information (to an imposter subscriber).

What is claimed is:

1. A method for securing mobile station provisioning comprising the steps of:

prior to a mobile station activation operation, providing to a subscriber of said mobile station a subscriber password and a network password;

subsequent to the providing of the subscriber password and the network password, receiving a request for mobile station provisioning;

upon receipt of said request
   requesting transmission of a subscriber password and verifying a received subscriber password; and wherein mobile station provisioning proceeds if the subscriber password is verified.

2. The method of claim 1 comprising the further steps of:

transmitting a network password to a subscriber; and receiving notice of verification of said network password, wherein mobile station provisioning proceeds only if notice of verification of the network password is received.

3. The method of claim 1 wherein said step of providing a subscriber password and network password comprises the steps of:

generating a subscriber password and a network password;

correlating the generated subscriber password and network password with a mobile station identifier;

securely transmitting the subscriber password and network password to the subscriber associated with said mobile station.

4. The method of claim 3 wherein said step of transmitting comprises communicating the subscriber password and network password to the subscriber via a land-line telephone.

5. The method of claim 3 wherein said step of transmitting comprises the steps of:

receiving a call via a land-line telephone from the subscriber;

verifying the subscriber; and communicating said subscriber password and said network password to said subscriber during said call after verifying the subscriber.

6. In a system for over-the-air activation of a mobile station, a method for mutual authentication of a subscriber and a network comprising the steps of:

provisioning a network password and a subscriber password to a subscriber associated with the mobile station;

at the time of activation sending said network password to the mobile station;

receiving a subscriber password from the mobile station;

verifying the received subscriber password by comparing the received subscriber password to the subscriber password provisioned to the mobile station's subscriber; and authorizing activation if said received subscriber password matches the provisioned subscriber password.

7. The method of claim 6 comprising the further steps of receiving notification of verification of said network password.

8. The method of claim 6 wherein said step of provisioning includes the steps of:

receiving a secure call from the subscriber; and correlating in a database subscriber information, mobile station information, the network password and the subscriber password.

9. The method of claim 8 wherein said secure call is via a land-line.

10. The method of claim 8 wherein one of said network password and said subscriber password is selected by the subscriber.

11. The method of claim 8 wherein the network selects said network password and said subscriber password and communicates said passwords to the subscriber during said secure call.

12. The method of claim 11 wherein said secure call is via a land-line.

13. The method of claim 6 wherein said step of provisioning comprises:

providing to said subscriber with the mobile station the network password and subscriber password; and correlating in a database subscriber information, mobile station information, the subscriber password and the network password.

14. The method of claim 13 wherein said mobile station information includes an ESN associated with said mobile station.

15. A method for mutual authentication for mobile station provisioning comprising the steps of:

during a password generation session at a network node, establishing a secure communication with a subscriber;
   generating a subscriber password and a network password; and
   transmitting said subscriber password and said network password to said subscriber; and during a provisioning session at a network node,
   receiving a first password from the mobile station;
   transmitting a second password to said mobile station; and
   provisioning said mobile station with activation data if said first password matches said subscriber password and said second password matches said network password.

16. The method of claim 15 wherein said step of establishing a secure communication comprises receiving a call via a land-line telephone; and verifying said subscriber.

* * * * *